US012753338B2

(12) United States Patent
Alanazi et al.

(10) Patent No.: US 12,753,338 B2
(45) Date of Patent: Oct. 6, 2026

(54) CORROSION INHIBITION COMPOSITIONS AND METHODS OF USE IN SOUR ENVIRONMENTS

(71) Applicants: Saudi Arabian Oil Company, Dhahran (SA); King Fahd University of Petroleum & Minerals, Dhahran (SA)

(72) Inventors: Nayef M. Alanazi, Dhahran (SA); Muhammad Imran Ul-haq, Dhahran (SA); Ime Bassey Obot, Dhahran (SA); Ahmad A. Sorour, Dhahran (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 846 days.

(21) Appl. No.: 18/176,129

(22) Filed: Feb. 28, 2023

(65) Prior Publication Data

US 2024/0294821 A1 Sep. 5, 2024

(51) Int. Cl.

| | |
|---|---|
| ***C23F 11/00*** | (2006.01) |
| ***A01N 31/00*** | (2006.01) |
| ***A01N 43/78*** | (2006.01) |
| ***C04B 9/02*** | (2006.01) |
| ***C09K 3/00*** | (2006.01) |
| ***C09K 8/54*** | (2006.01) |
| ***C23C 22/00*** | (2006.01) |

(52) U.S. Cl.
CPC ............ *C09K 8/54* (2013.01); *C09K 2208/20* (2013.01); *C09K 2208/32* (2013.01)

(58) Field of Classification Search
CPC ........ C09K 15/30; C09K 13/00; C09K 13/10; C09K 5/10; C09K 5/20; C09K 3/00; A61K 31/425; H01L 21/30608; C23F 11/02; A01N 25/10; C23C 22/05
USPC ....... 514/367; 504/354; 106/14.21; 148/243; 252/387
See application file for complete search history.

(56) References Cited

U.S. PATENT DOCUMENTS 4,149,969 A 4/1979 Robitaille et al.
4,343,660 A 8/1982 Martin
4,515,708 A 5/1985 Haslegrave et al.
4,605,505 A 8/1986 Yanagida et al.
4,673,436 A 6/1987 Haslegrave et al.
4,675,158 A 6/1987 Klindera
4,744,948 A 5/1988 Incorvia
4,764,298 A 8/1988 Croudace
(Continued)

FOREIGN PATENT DOCUMENTS

GB 1049044 11/1966

OTHER PUBLICATIONS

Balaskas et al., "Corrosion protection mechanism of 2-mercaptobenzothiazole and its potential synergistic effect with cerium ions for treatment of AA 2024-T3," Journal of Electroanalytical Chemistry, Apr. 15, 2020, 863:1-11, 11 pages.
(Continued)

*Primary Examiner* — Monzer R Chorbaji
(74) *Attorney, Agent, or Firm* — Fish & Richardson P.C.

(57) ABSTRACT

The disclosure relates to corrosion inhibition compositions and methods of using such compositions to inhibit corrosion in a sour environment. The compositions and methods can be used in various settings, such as an oil and gas carrying pipeline and/or a component in an oil and gas facility that would handle a sour aqueous fluid.

20 Claims, 4 Drawing Sheets

(56) References Cited

U.S. PATENT DOCUMENTS

| | | | | |
|---|---|---|---|---|
| 5,611,991 | A | 3/1997 | Naraghi | |
| 6,110,950 | A | 8/2000 | Pillay | |
| 6,248,701 | B1 | 6/2001 | Church | |
| 10,138,117 | B2 * | 11/2018 | Chen | C09K 13/10 |
| 10,604,710 | B2 | 3/2020 | Moloney | |
| 10,843,926 | B2 | 11/2020 | Dai et al. | |
| 10,988,670 | B2 | 4/2021 | Obot et al. | |
| 2010/0219379 | A1 | 9/2010 | Acosta et al. | |
| 2013/0233543 | A1 | 9/2013 | Overkempe et al. | |
| 2015/0162213 | A1 * | 6/2015 | Chen | H01L 21/32134 438/754 |
| 2018/0282606 | A1 | 10/2018 | Rodgers et al. | |

OTHER PUBLICATIONS

Cen et al., "2-Mercaptobenzothiazole as a corrosion inhibitor for carbon steel in supercritical CO2—H2O condition," Applied Surface Science, May 15, 2019, 476:422-434, 13 pages.

Finsgar et al., "An electrochemical, long-term immersion, and XPS study of 2-mercaptobenzothiazole as a copper corrosion inhibitor in chloride solution," Corrosion Science, Jun. 2014, 83:164-175, 12 pages.

Gharaghooshia et al., "Study of Adsorption/Desorption Effect of 2-Mercaptobenzothiazole as Sweet Corrosion Inhibitor on API-5L X60 Steel," Protection of Metals and Physical Chemistry of Surface, 2020, pp. 1-15, 14 pages.

Gholami et al., "Correlated ab Initio and Electroanalytical Study on Inhibition Behavior of 2-Mercaptobenzothiazole and Its Thiole-Thione Tautomerism Effect for the Corrosion of Steel (API 5L X52) in Sulphuric Acid Solution," Industrial & Engineering Chemistry Research, Oct. 10, 2013, 52:14875-14889, 15 pages.

Goudarzi et al., "Investigation on 2-mercaptobenzothiazole behavior as corrosion inhibitor for 316-stainless steel in acidic media," Anti-Corrosion Methods and Materials, 2014, 61(1):20-26, 7 pages.

Hoseizadeh et al., "Adsorption and corrosion inhibitive properties of 2-Mercaptobenzothiazole on AISI steel 4130 alloy in hydrochloric acid solution," Kovove Mater, 2014, 52:35-45, 11 pages.

Jafari et al., "Corrosion inhibition of carbon steel immersed in a 1 M HCl solution using benzothiazole derivatives," Arabian Journal of Chemistry, Nov. 2019, 12(7):1387-1394, 8 pages.

Liu et al., "Enhancing the self-healing property by adding the synergetic corrosion inhibitors of Na3PO4 and 2-mercaptobenzothiazole into the coating of Mg alloy," Electrochimica Acta, Nov. 10, 2019, 323:1-7, 7 pages.

Shahrabi et al., "Corrosion inhibition of copper in sulphuric acid by some nitrogen heterocyclic compounds," Anti-Corrosion Methods and Materials, 2007, 54(5):308-313, 6 pages.

Xhanari et al., "The Corrosion Inhibition of AA6082 Aluminium Alloy by Certain Azoles in Chloride Solution: Electrochemistry and Surface Analysis," Coatings, 2019, 9(380):1-15, 15 pages.

Zhang et al., "Inhibition performance of 2-mercaptobenzothiazole derivatives in CO2 saturated solution and its adsorption behavior at Fe surface," Applied Surface Science, Jul. 15, 2007, 253(18):7416-7422, 7 pages.

* cited by examiner

CORROSION INHIBITION COMPOSITIONS AND METHODS OF USE IN SOUR ENVIRONMENTS

FIELD

The disclosure relates to corrosion inhibition compositions and methods of using such compositions to inhibit corrosion in a sour environment, such as a hydrogen sulfide ($H_2S$)-containing environment of an oil and gas system or component. The compositions and methods can be used in various settings, such as an oil and gas carrying pipeline and/or a component in an oil and gas facility that would handle a sour aqueous fluid.

BACKGROUND

Hydrogen sulfide and/or carbon dioxide ($CO_2$) in produced oil and gas can cause corrosion in transportation pipelines and oil and gas processing facilities by dissolving in water and corroding metal (e.g., steel).

Existing corrosion inhibitors often do not provide satisfactory performance in sour environments, such as sour environments that contain hydrogen sulfide, and optionally carbon dioxide and/or brine. Additionally, turbulent fluid flow can increase wall sheer stress under high pressure conditions which reduces (e.g., prevents) adhesion of the protective layers formed by corrosion inhibitors in pipelines.

SUMMARY

The disclosure relates to corrosion inhibition compositions and methods of using such compositions to inhibit corrosion in a sour environment (e.g., due to the presence of hydrogen sulfide and optionally carbon dioxide). The compositions and methods can be used in various settings, such as an oil and gas carrying pipeline (e.g., a production pipeline, a transportation pipeline) and/or a component in an oil and gas facility that would handle a sour aqueous fluid (e.g., a crude producing facility, a crude processing facility, a gas oil separation plant). The compositions include a 2-substituted benzothiazole, a cationic surfactant, an ammonium salt, a glycol and a solvent that can include water.

The compositions and methods can provide improved corrosion inhibition performance in sour environments relative to certain other corrosion inhibitors. The compositions can reduce (e.g., prevent) pipeline leaks, pipeline bursting, preventative maintenance, turnaround maintenance, and/or losses in production as well as financial costs associated with these events. Without wishing to be bound by theory, it is believed that the compositions can form a protective film on a metal surface to provide protection from corrosion. The compositions and methods provide improved corrosion inhibiting films relative to certain other corrosion inhibitors (see discussion below).

The compositions and methods can be relatively inexpensive to produce and/or implement. The compositions can be used at relatively low concentrations and/or volumes relative to certain other corrosion inhibitors. The corrosion inhibitors can exhibit stability over a period of several months and greater stability relative to certain other corrosion inhibitor compositions. The compositions and methods are less toxic than certain other corrosion inhibition compositions. Thus, water pollution can be reduced relative to the use of certain other corrosion inhibition compositions.

In a first aspect, the disclosure provides a composition, including a 2-substituted benzothiazole of formula:

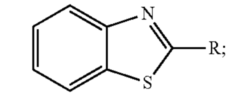

where R is $C_{1-18}$ alkyl, —SH, —$NH_2$, —NH-phenyl, —OH, —C(O)H, —$Si(CH_3)_3$, —$CO_2H$, or —$C_{1-6}$ alkyl-OH; a cationic surfactant of formula:

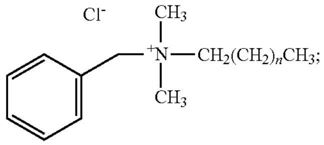

where n=12, 14, 16 or 18; an ammonium salt; a glycol; and a solvent that includes water.

In some embodiments, the composition includes 1-15 wt. % of the 2-substituted benzothiazole, 1-10 wt. % of the cationic surfactant, 1-5 wt. % of the ammonium salt, 1-50% of the glycol, and 1-50% of the solvent.

In some embodiments, the composition includes 1-9 wt. % of the 2-substituted benzothiazole, 1-5 wt. % of the cationic surfactant, 1-5 wt. % of the ammonium salt, 1-50% of the glycol, and 1-50% of the solvent.

In some embodiments, the composition includes 7-9 wt. % of the 2-substituted benzothiazole, 3-5 wt. % of the cationic surfactant, 1-3 wt. % of the ammonium salt, 40-50% of the glycol, and 40-50% of the solvent.

In some embodiments, the 2-substituted benzothiazole includes 2-mercaptobenzothiazole.

In some embodiments, the cationic surfactant includes benzyl dodecyl dimethylammonium chloride.

In some embodiments, the ammonium salt includes an ammonium halide, ammonium thiocaytanate, ammonium carbonate, and/or ammonium sulphate.

In some embodiments, the glycol includes ethylene glycol, propylene glycol, propyl ether, dipropylene glycol dimethyl ether, and/or ethylene glycol diethyl ether.

In some embodiments, a ratio of the 2-substituted benzothiazole to cationic surfactant to ammonium salt by weight is 4:2:1.

In some embodiments, the 2-substituted benzothiazole includes 2-mercaptobenzothiazole, the cationic surfactant includes benzyl dodecyl dimethylammonium chloride, and the ammonium salt includes ammonium iodide.

In some embodiments, the composition includes 8.5 wt. % 2-mercaptobenzothiazole, 4.3 wt. % benzyl dodecyl dimethylammonium chloride, 2.2 w.t % ammonium iodide, 42.5 wt. % ethylene glycol, and 42.5 wt. % water.

In a second aspect, the disclosure provides a method, including disposing a composition of the disclosure into a first liquid including hydrogen sulfide, thereby forming a second liquid, and contacting the second liquid with a member selected from the group consisting of an oil and gas carrying pipeline, a crude producing facility, and a crude processing facility, thereby inhibition corrosion of the member.

In certain embodiments, the first liquid further includes carbon dioxide.

In certain embodiments, a ratio of hydrogen sulfide to carbon dioxide in the first liquid is at least 1:200.

In certain embodiments, the member includes steel.

In certain embodiments, the composition is present in the second liquid at a concentration of 5 ppm to 100 ppm.

In certain embodiments, the composition includes 1-15 wt. % of the 2-substituted benzothiazole, 1-10 wt. % of the cationic surfactant, 1-5 wt. % of the ammonium salt, 1-50% of the glycol, and 1-50% of the solvent.

In certain embodiments, a ratio of the 2-substituted benzothiazole to cationic surfactant to ammonium salt by weight is 4:2:1.

In certain embodiments, the 2-substituted benzothiazole includes 2-mercaptobenzothiazole, the cationic surfactant includes benzyl dodecyl dimethylammonium chloride, and the ammonium salt includes ammonium iodide.

In certain embodiments, the composition includes 8.5 wt. % 2-mercaptobenzothiazole, 4.3 wt. % benzyl dodecyl dimethylammonium chloride, 2.2 w.t % ammonium iodide, 42.5 wt. % ethylene glycol, and 42.5 wt. % water.

DETAILED DESCRIPTION

Compositions

Figure 1:
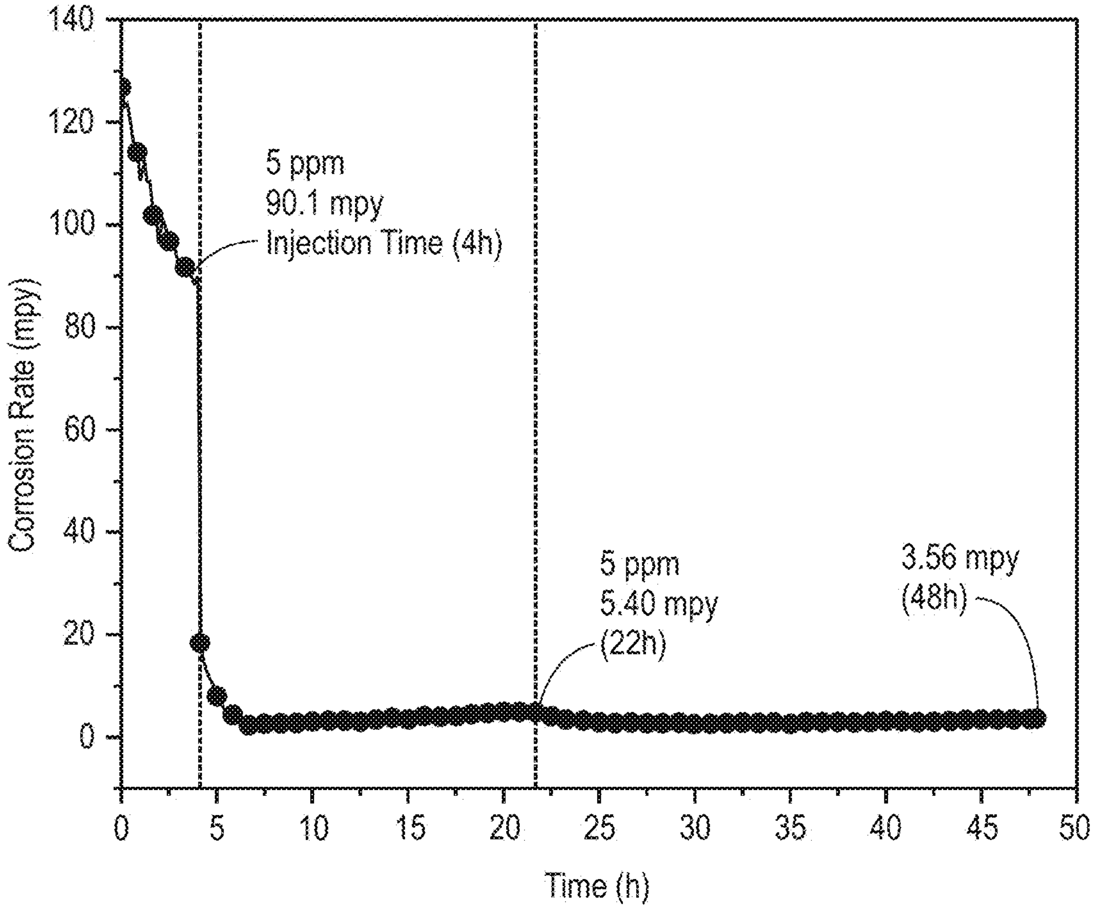
FIG. 1 depicts a graph of the corrosion rate as a function of time as measured by linear polarization resistance in the absence and presence of corrosion inhibitor.

The disclosure provides a composition that includes a 2-substituted benzothiazole, a cationic surfactant, an ammonium salt, a glycol and a solvent. The compositions can be used to reduce (e.g., eliminate) corrosion in settings such as, an oil and gas carrying pipeline and/or a component in an oil and gas facility that would handle a sour aqueous fluid (see discussion below).

The 2-substituted benzothiazole has the formula:

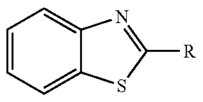

where R is $C_{1-18}$ alkyl (e.g., $C_{1-6}$ alkyl, $C_{1-5}$ alkyl, methyl, ethyl, n-propyl, isopropyl, butyl, pentyl), —SH, —$NH_2$, —NH-phenyl, —OH, —C(O)H, —$Si(CH_3)_3$, —$CO_2H$, or —$C_{1-6}$ alkyl-OH. Examples of the 2-substituted benzothiazole include 2-mercaptobenzothiazole, 2-methylbenzothiazole, 2-ethylbenzothiazole, 2-propylbenzothiazole, 2-isopropylbenzothiazole, 2-butylbenzothiazole, 2-pentylbenzothiazole, 2-methylbenzothiazole 2-aminobenzothiazole, 2-N-phenylaminobenzothiazole, 2-hydroxylbenzothiazole, 2-formylbenzothiazole, 2-trimethylsilylbenzothiazole, 2-carboxybenzothiazole, 2-(hydroxymethyl) benzothiazole, and 2,2'-dithiobis(benzothiazole).

The cationic surfactant has the formula:

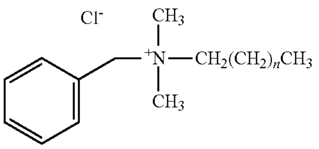

where n=12, 14, 16, or 18.

Examples of the ammonium salt include an ammonium halide (e.g., ammonium chloride, ammonium bromide, ammonium iodine), ammonium thiocaytanate, ammonium carbonate, and ammonium sulphate. In certain embodiments, the ammonium halide includes ammonium iodine. Without wishing to be bound by theory, it is believed that the ammonium salt serves as an intensifier. The intensifier increases the bonding of the 2-substituted benzothiazole and the cationic surfactant onto the metal (e.g., steel) surface through electrostatic (Van der Waals) interactions (see discussion below).

Examples of the glycol include ethylene glycol, propylene glycol, propyl ether, dipropylene glycol dimethyl ether, and ethylene glycol diethyl ether. Without wishing to be bound by theory, it is believed that the glycol servers as a stabilizer. The stabilizer increases the dissolution and/or stability of the 2-substituted benzothiazole and/or the cationic surfactant in solution.

In certain embodiments, the 2-substituted benzothiazole is 2-mercaptobenzothiazole.

In certain embodiments, the cationic surfactant is benzyl dodecyl dimethylammonium chloride.

In certain embodiments, the 2-substituted benzothiazole is 2-mercaptobenzothiazole and the cationic surfactant is benzyl dodecyl dimethylammonium chloride.

In certain embodiments, the 2-substituted benzothiazole is 2-mercaptobenzothiazole, the cationic surfactant is benzyl dodecyl dimethylammonium chloride, and the ammonium salt is ammonium iodide. In certain embodiments, the 2-substituted benzothiazole is 2-mercaptobenzothiazole, the cationic surfactant is benzyl dodecyl dimethylammonium chloride, the ammonium salt is ammonium iodide, and the glycol is ethylene glycol.

In some embodiments, the composition includes at least 1 (e.g., at least 2, at least 3, at least 4, at least 5, at least 6, at least 7, at least 8, at least 9, at least 10, at least 11, at least 12, at least 13, at least 14) wt. % and/or at most 15 (e.g., at most 14, at most 13, at most 12, at most 11, at most 10, at most 9, at most 8, at most 7, at most 6, at most 5, at most 4, at most 3, at most 2) wt. % of the 2-substituted benzothiazole (e.g., 2-mercaptobenzothiazole).

In some embodiments, the composition includes at least 1 (e.g., at least 2, at least 3, at least 4, at least 5, at least 6, at least 7, at least 8, at least 9) wt. % and/or at most 10 (e.g., at most 9, at most 8, at most 7, at most 6, at most 5, at most 4, at most 3, at most 2) wt. % of the cationic surfactant (e.g., benzyl dodecyl dimethylammonium chloride).

In some embodiments, the composition includes at least 1 (e.g., at least 2, at least 3, at least 4) wt. % and/or at most 5 (e.g., at most 4, at most 3, at most 2) wt. % of the ammonium salt (e.g., ammonium iodine).

In some embodiments, the composition includes at least 1 (e.g., at least 5, at least 10, at least 15, at least 20, at least 25, at least 30, at least 35, at least 40, at least 45) wt. % and/or at most 50 (e.g., at most 45, at most 40, at most 35, at most 30, at most 25, at most 20, at most 15, at most 10, at most 5) wt. % of the glycol (e.g., ethylene glycol).

In some embodiments, the composition includes at least 1 (e.g., at least 5, at least 10, at least 15, at least 20, at least 25, at least 30, at least 35, at least 40, at least 45) wt. % and/or at most 50 (e.g., at most 45, at most 40, at most 35, at most 30, at most 25, at most 20, at most 15, at most 10, at most 5) wt. % of the solvent.

In certain embodiments, a ratio of the 2-substituted benzothiazole to the cationic surfactant by weight is at least 1:10 (e.g., at least 1:9, at least 1:8, at least 1:7, at least 1:6, at least 1:5, at least 1:4, at least 1:3, at least 1:2, at least 1:1, at least 2:1, at least 3:1, at least 4:1, at least 5:1, at least 6:1, at least 7:1, at least 8:1, at least 9:1, at least 10:1, at least 11:1, at least 12:1, at least 13:1, at least 14:1) and/or at most 15:1 (e.g., at most 14:1, at most 13:1, at most 12:1, at most 11:1, at most 10:1, at most 9:1, at most 8:1, at most 7:1, at most 6:1, at most 5:1, at most 4:1, at most 3:1, at most 2:1, at most 1:1, at most 1:2, at most 1:3, at most 1:4, at most 1:5, at most 1:6, at most 1:7, at most 1:8, at most 1:9).

In certain embodiments, a ratio of the 2-substituted benzothiazole to the ammonium salt by weight is at least 1:5 (e.g., at least 1:4, at least 1:3, at least 1:2, at least 1:1, at least 2:1, at least 3:1, at least 4:1, at least 5:1, at least 6:1, at least 7:1, at least 8:1, at least 9:1, at least 10:1, at least 11:1, at least 12:1, at least 13:1, at least 14:1) and/or at most 15:1 (e.g., at most 14:1, at most 13:1, at most 12:1, at most 11:1, at most 10:1, at most 9:1, at most 8:1, at most 7:1, at most 6:1, at most 5:1, at most 4:1, at most 3:1, at most 2:1, at most 1:1, at most 1:2, at most 1:3, at most 1:4).

In certain embodiments, a ratio of the cationic surfactant to the ammonium salt by weight is at least 1:5 (e.g., at least 1:4, at least 1:3, at least 1:2, at least 1:1, at least 2:1, at least 3:1, at least 4:1, at least 5:1, at least 6:1, at least 7:1, at least 8:1, at least 9:1) and/or at most 10:1 (e.g., at most 9:1, at most 8:1, at most 7:1, at most 6:1, at most 5:1, at most 4:1, at most 3:1, at most 2:1, at most 1:1, at most 1:2, at most 1:3, at most 1:4).

In certain embodiments, the ratio of the 2-substituted benzothiazole to the cationic surfactant by weight is 4:2. In certain embodiments, the ratio of the 2-substituted benzothiazole to the ammonium salt by weight is 4:1. In certain embodiments, the ratio of the cationic surfactant to the ammonium salt by weight is 2:1. In certain embodiments, the ratio of the 2-substituted benzothiazole to cationic surfactant to ammonium salt by weight is 4:2:1. Without wishing to be bound by theory, it is believed that a ratio of the ratio of the 2-substituted benzothiazole to cationic surfactant to ammonium salt (e.g., 2-mercaptobenzothiazole to benzyl dodecyl dimethylammonium chloride to ammonium iodide) by weight of 4:2:1 can provide improved corrosion inhibition and/or increased stability in solution relative to certain other formulations that include different ratios and/or constituents.

In some embodiments, the composition includes 8.5 wt. % of the 2-substituted benzothiazole, 4.3 wt. % of the cationic surfactant, 2.2 w.t % of the ammonium salt, 42.5 wt. % of the glycol, and 42.5 wt. % of the solvent. In some embodiments, the composition includes 8.5 wt. % 2-mercaptobenzothiazole, 4.3 wt. % benzyl dodecyl dimethylammonium chloride, 2.2 wt. % ammonium iodide, 42.5 wt. % ethylene glycol, and 42.5 wt. % water.

Corrosion in Sour Environments

Without wishing to be bound by theory, it is believed that sour corrosion has a mechanism distinct from certain other forms of corrosion. Hydrogen sulfide gas can dissolve in an aqueous solution according to reaction (1)

$$H_2S_{(g)} \longleftrightarrow H_2S_{(aq)} \tag{1}$$

Aqueous hydrogen sulfide can directly dissociate after dissolving to form bisulfide ($HS^-$) and/or sulfide ($S^{2-}$) species as shown in reactions (2) and (3), respectively. Hydrogen sulfide can also act as a source of hydrogen ions.

$$H_2S_{(aq)} \longleftrightarrow H^+_{(aq)} + HS^-_{(aq)} \tag{2}$$

$$HS^-_{(aq)} \longleftrightarrow H^+_{(aq)} + S^{2-}_{(aq)} \tag{3}$$

Hydrogen sulfide can also undergo a reduction, as shown in reaction (4)

$$2H_2S_{(aq)} + 2e^- \longleftrightarrow H_{2(g)} + 2HS^-_{(aq)} \tag{4}$$

The overall reaction with iron in steel in a sour environment can be written as $$Fe_{(s)} + H_2S_{(aq)} \longleftrightarrow FeS_{(s)} + H_{2(g)} \tag{5}$$

Thus, in sour corrosion, FeS can form rather than, or in addition to, the iron undergoing oxidation. Without wishing to be bound by theory, it is believed that depending on the conditions, one or more types of FeS can be formed (e.g., troilite, cubic FeS, and mackinawite). Two different layers are believed to be present: a porous and thick outer layer (mackinawite), and a thin and dense inner layer (cubic FeS).

Formation of Films

Without wishing to be bound by theory, it is believed that one or more species in the compositions can interact with the surface (e.g., metal-containing surface, such as steel) to be protected to form a protective film on a metal surface by chemisorption and/or physisorption to provide protection from corrosion. This film formation reduces (e.g., prevents) access of hydrogen sulfide to the metal surface, thereby reducing (e.g., preventing) the occurrence of the reaction shown in equation (5) and the formation of FeS.

Without wishing to be bound by theory, it is believed that the 2-substituted benzothiazoles have a relatively high inhibition efficiency due to relatively strong film formation. The R groups of the 2-substituted benzothiazoles (e.g., alkyl, —SH, —$NH_2$) include electron rich atoms that can donate excess electrons to the metal (e.g., steel) surface to allow for relatively strong bonding of the film to the surface (chemisorption).

Without wishing to be bound by theory, it is believed that the cationic surfactant can have an electrostatic interaction with $HS^-$ (produced in reaction (2)) to form an electrostatic bond on the metal (e.g., steel) surface (physisorption), thereby protecting the metal surface from corrosion due to $HS^-$.

Use of Corrosion Inhibition Compositions in Sour Environments

The compositions can be used to reduce (e.g., prevent) corrosion of a metal due to a sour environment (e.g., due to the presence of hydrogen sulfide and optionally carbon dioxide). The compositions can be used to reduce (e.g., prevent) corrosion in an aqueous fluid that contains hydrogen sulfide and optionally carbon dioxide, such as an aqueous fluid in an oil and gas carrying pipeline (e.g., a production pipeline, a transportation pipeline) and/or a component in an oil and gas facility that would handle a sour aqueous fluid (e.g., a crude producing facility, a crude processing facility, a gas oil separation plant). Hydrogen sulfide can be present in a producing formation and/or from a surface source, such as injection water. In some embodiments, the aqueous fluid contains a brine that include chlorides.

The compositions can inhibit corrosion in a component, sub-system or system made of a metal-containing material, such as steel (e.g., carbon steel, stainless steel). Typically, the components, sub-systems and systems disclosed in the preceding paragraph are made of such materials.

Without wishing to be bound by theory, it is believed that sour environments can provide relatively aggressive corrosion environments for certain metals (e.g., steel), particularly under relatively high hydrogen sulfide to carbon dioxide ratios, where FeS corrosion products dominate. Pitting mechanisms are also expected to occur. In certain embodiments, the hydrogen sulfide to carbon dioxide ratio in the aqueous fluid being treated is at least 1:200 (e.g., at least 1:150, at least 1:100, at least 1:50).

In general, the compositions can be used at any appropriate concentration. In some embodiments, the corrosion inhibitor is used at a concentration of at least 5 (e.g., at least 10, at least 15, at least 20, at least 25, at least 30, at least 35, at least 40, at least 45, at least 50, at least 55, at least 60, at least 65, at least 70, at least 75, at least 80, at least 85, at least 90, at least 95) ppm and/or at most 100 (e.g., at most 95, at most 90, at most 85, at most 80, at most 75, at most 70, at most 65, at most 60, at most 55, at most 50, at most 45, at most 40, at most 35, at most 30, at most 25, at most 20, at most 15, at least 10) ppm.

The corrosion rate can calculated using a weight loss as shown in equation (1)

$$\text{Corrosion rate } (mpy) = \frac{22300 \times \Delta w}{\rho \times A \times T} \quad (1)$$

where ΔW is the weight loss in mg, p is the density the sample, A is an area of the exposed sample, and T is the exposure time. In some embodiments, for a standard mild steel coupon (C-1018) with a density of 7.89 g/cm$^3$, an exposed area of 7.86 square inches and an exposure time of one day, the corrosion rate is at least 2.87 (e.g., at least 3, at least 3.5, at least 4, at least 4.5) mils per year (mpy) and/or at most 5 (e.g., at most 4.5, at most 4, at most 3.5, at most 3) mpy.

The corrosion inhibition efficiency can be calculated using equation (2)

$$\text{Inhibition efficiency } (IE\ \%) = \left(\frac{CR_{blank} - CR_{inhibitor}}{CR_{blank}}\right) \times 100 \quad (2)$$

where $CR_{blank}$ and $CR_{inhibitor}$ are the corrosion rate, as calculated by equation (1), in the absence and presence of a corrosion inhibitor, respectively. In some embodiments, the corrosion inhibition efficiency is at least 73 (e.g., at least 75, at least 80, at least 85, at least 90, at least 95, at least 98) % and/or at most 98.8 (e.g., at most 98.5, at most 98, at most 95, at most 90, at most 85, at most 80, at most 75) %.

EXAMPLES

Example 1

Composition 1 was prepared by dissolving 8.5 wt. % of 2-mercaptobenzothiazole, 4.3 wt. % of benzyl dodecyl dimethylammonium chloride, and 2.2 wt. % of ammonium iodide into a 85 wt. % glycol-water mixture in a graduated glass bottle. The resulting solution was heated to a temperature of 50° C. on a hot plate for 24 hours to ensure complete dissolution and stability of the mixture. The composition of Composition 1 is shown in Table 1. All reagents were obtained from Sigma Aldrich.

TABLE 1

Composition of Composition 1

| Component | Weight percent (wt. %) |
|---|---|
| 2-mercaptobenzothiazole | 8.5 |
| benzyl dodecyl dimethylammonium chloride | 4.3 |
| ammonium iodide | 2.2 |
| ethylene glycol | 42.5 |
| water | 42.5 |

Composition 1 was observed to be stable after several months of storage, by observing for uniformity. Other corrosion inhibition compositions prepared were not stable in solution after 2 months so were not evaluated further.

Example 2

Linear polarization resistance (LPR) was used to test the corrosion inhibition performance of Composition 1. LPR was measured using a Gamry 1010E Potentiostat/Galvanostat (Gamry Inc., USA). The LPR of a C1018 carbon steel coupon was measured in 3.5% NaCl in saturated carbon dioxide in the presence of hydrogen sulfide at 55° C. The gas composition is shown in Table 3. The solution was continuously stirred using a magnetic stirrer set at 500 rpm throughout the test. After 2 hours of purging, the test coupon was immersed into the corrosion cell and open circuit potential (OCP) was measured for 1 h to ensure the stability of the potential with time. Corrosion rate logging using linear polarization resistance (LPR) was initiated and the corrosion rate was recorded automatically every 10 minutes. The test was then left for a further 44 h. The corrosion rate was measured for four hours without the addition of corrosion inhibitor, followed by two sequential additions of 5 ppm of composition 1 after 4 hours and 22 hours.

FIG. 1 shows the results of the LPR measurement. The initial baseline corrosion rate after 4 hours, prior to the introduction of Composition 1, was 90.1 mpy. After the first injection of 5 ppm of Composition 1, the corrosion rate dropped to 3.5 mpy. After the second injection of 5 ppm of Composition 1, the corrosion rate remained the same until the end of the experiment.

The results indicate that 5 ppm is a sufficient dosage to inhibit corrosion below an acceptable industrial corrosion rate in the oil and gas sector (5 mpy).

Example 3

Potentiodynamic polarization (PDP) was used to test the corrosion inhibition performance of Composition 1. Potentiodynamic polarization (Tafel) plots were obtained to investigate the anodic and cathodic electrochemical processes that occur on the C1018 carbon steel surface during the corrosion and the corrosion inhibition processes. Using the methods of Example 2, concentrations of Composition 1 of 10, 25, 50 and 100 ppm were used for potentiodynamic polarization (PDP) experiments. The PDP curves were measured with potentials from −250 to +250 mV vs. SCE using a 0.5 mV/s scan rate.

Figure 2:
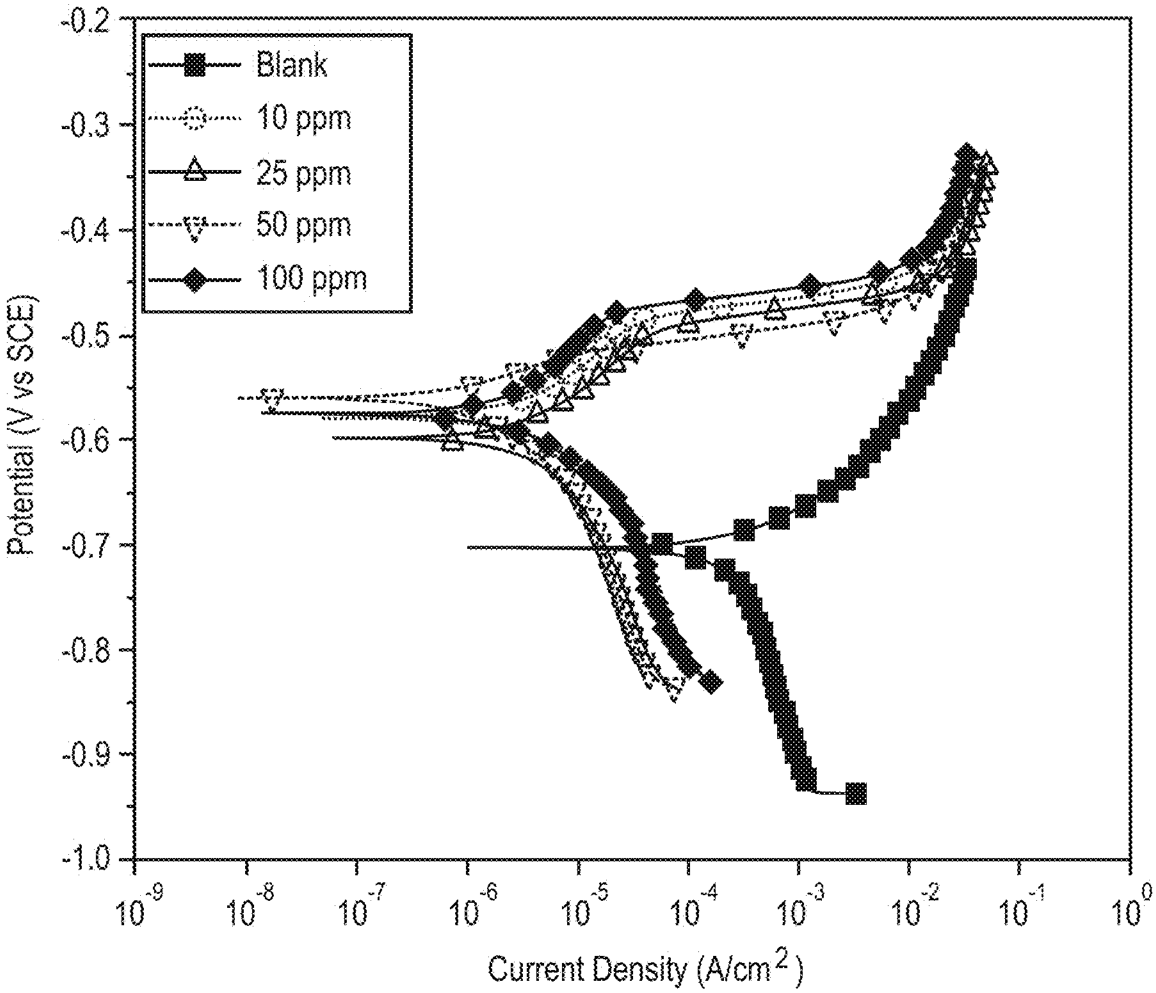
FIG. 2 depicts a graph of the potential as a function of current density as measured by potentiodynamic polarization for several corrosion inhibitor concentrations.

FIG. 2 shows Tafel plots for C1018 carbon steel coupon in 3.5% NaCl containing a mixture of hydrogen sulfide and carbon dioxide at 55° C. without and after the addition of 10, 25, 50 and 100 ppm of Composition 1. Table 2 presents kinetic electrochemical corrosion parameters, such as the corrosion current density ($i_{corr}$), corrosion potential ($E_{corr}$), and corrosion rates (mpy) obtained from the extrapolation of the anodic and cathodic Tafel lines.

Inhibition efficiency (IE %) values were calculated from the electrochemical measurements using equations 3 and 4.

$$IE_{LPR} = 1 - \frac{R_{p(blank)}}{R_{p(inh)}} \times 100\% \quad (3)$$

where $R_{p(blank)}$ and $R_{p(inh)}$ are the polarization resistance recorded in the absence and presence of Composition 1, respectively.

$$IE_{PDP} = 1 - \frac{i_{corr(inh)}}{i_{corr(blank)}} \times 100\% \quad (4)$$

where $i_{corr(blank)}$ and $i_{corr(inh)}$ are the corrosion current density recorded in the absence and presence of Composition 1, respectively.

TABLE 2

PDP data

| Concentration | $E_{corr}$ (mV) | $i_{corr}$ (μAcm$^{-2}$) | C.R. (mpy) | Percent Protection (IE %) |
|---|---|---|---|---|
| Blank | −702 | 310.0 | 114.5 | — |
| 10 ppm | −578 | 6.96 | 3.18 | 97.22 |
| 25 ppm | −597 | 3.65 | 1.67 | 98.54 |
| 50 ppm | −559 | 2.84 | 1.29 | 98.80 |
| 100 ppm | −574 | 6.25 | 2.87 | 97.49 |

FIG. 2 shows that the addition of Composition 1 shifted the potential to the anodic side compared to the blank, indicating that the inhibitor is anodic in nature. The $E_{corr}$ was shifted from −702 mV to −559 mV with the addition of 50 ppm of Composition 1. The corrosion current density decreased from 310 (μA/cm$^2$) to 2.84 (μA/cm$^2$), corresponding to a 109-fold decrease. This reduced the corrosion rate of the C1018 carbon steel from 114.5 mpy (blank) to 1.29 mpy with the addition of 50 ppm of Composition 1, corresponding to an inhibition efficiency of 98.8%. Addition of 100 ppm of Composition 1 did not lead to further improvement of the inhibition efficiency. The PDP results were in excellent agreement with the LPR results (Example 2) showing the reliability of the corrosion inhibition evaluation.

Example 4

The performance of Composition 1 was evaluated and compared with commercial corrosion inhibitor using a high temperature and high-pressure (HTHP) autoclave rotating cage to simulate field environments. The commercial corrosion inhibitor included an alkyl benzyl pyridinium salt and imidazoline derivative.

A HTHP autoclave rotating cage was used to conduct the corrosion tests under simulated and controlled dynamic field conditions. A four-liter reactor was constructed from C-276 alloy, allowing it to withstand harsh corrosive environments. The test material was carbon steel coupons (1018) and the coupons were cleaned and degreased before and after testing following the ASTM G1 “Practice for preparing, cleaning and evaluating corrosion test specimen procedure”. The coupons were positioned in a fixed cage made out of PEEK material and then mounted in the autoclave.

The autoclave was purged with N2 to remove dissolved oxygen. The autoclave was then pressurized with hydrogen sulfide and carbon dioxide. The autoclave was heated to the required test temperature of 182° F. The detailed experimental conditions and parameters are presented in Table 3.

A kerosene:water (1:1) mixture was stirred at room temperature with 10 ppm of corrosion inhibitor sample (Composition 1 or commercial corrosion inhibitor) in the autoclave. After 2 hours, the kerosene was removed and the remaining water was used in the autoclave for the final test. The final pressure was maintained at the required pressure (250 psi) using high purity nitrogen gas. In all tests, the corrosion inhibitor formulations were injected immediately after fixing the coupons in the autoclave. The corrosion rate and inhibition efficiency of the samples were calculated using a weight loss and equations (1) and (2) (see discussion above). The density of the standard mild steel coupon (C-1018) was 7.89 g/cm$^3$, the area of the exposed coupon was 7.86 square inches and the exposure time was one day.

TABLE 3

Experimental conditions for performance evaluation of corrosion inhibitors using HTHP autoclave rotating cage

| Water geochemical analysis | | Operational conditions | | | | Gas composition | Time (h) | RPM | Conc (ppm) |
|---|---|---|---|---|---|---|---|---|---|
| Na | 29500 mg/L | Pressure (psi) | Temp (° F.) | Water cut (%) | Kerosene (%) | 7 mol. % $CO_2$<br>3 mol. % $H_2S$<br>90 mol. % $N_2$ | 25 | 400 | 10 |
| Ca | 8210 mg/L | 250 | 182 | 50 | 50 | | | | |
| Mg | 1080 mg/L | | | | | | | | |
| Cl | 61800 mg/L | | | | | | | | |

TABLE 3-continued

| Experimental conditions for performance evaluation of corrosion inhibitors using HTHP autoclave rotating cage | | | | | | |
|---|---|---|---|---|---|---|
| Water geochemical analysis | | Operational conditions | Gas composition | Time (h) | RPM | Conc (ppm) |
| $SO_4$ | 1300 mg/L | | | | | |
| $HCO_3$ | 662 mg/L | | | | | |
| TDS | 102552 mg/L | | | | | |
| pH | 6.6 | | | | | |

Figure 3A:
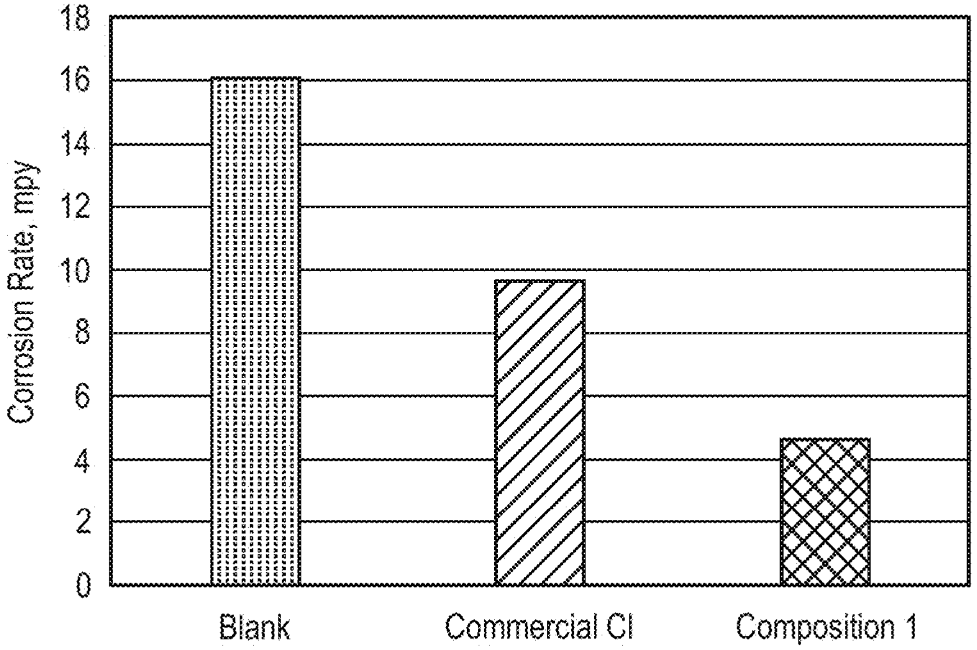
FIG. 3A depicts a bar graph of the corrosion rate of different corrosion inhibitors.
Figure 3B:
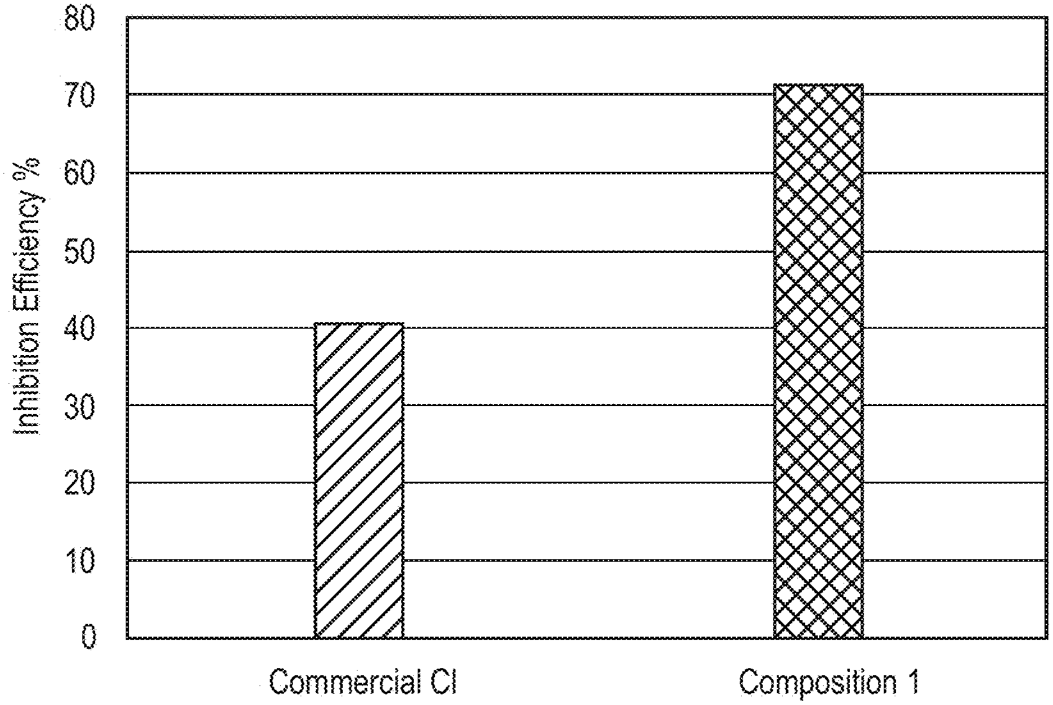
FIG. 3B depicts a bar graph of the inhibition efficiency of different corrosion inhibitors.

The corrosion rate and corrosion inhibition efficiency of the commercial corrosion inhibitor and Composition 1 are shown in FIGS. 3A and 3B, respectively. Composition 1 had a lower corrosion rate and higher corrosion inhibition efficiency than the commercial corrosion inhibitor used.

Figure 4A:
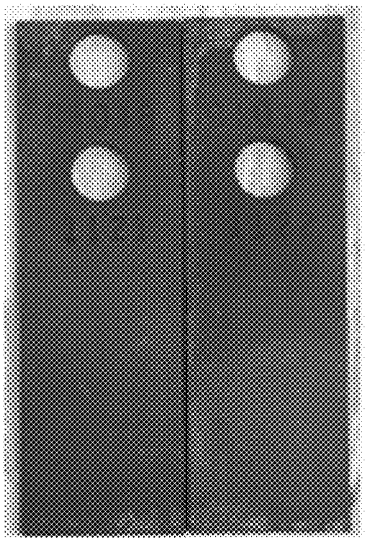
FIG. 4A depicts a photograph of a steel coupon after testing with a corrosion inhibitor, before cleaning.
Figure 4B:
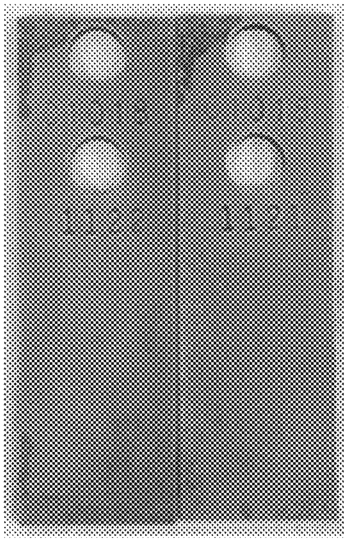
FIG. 4B depicts a photograph of a steel coupon after testing with a corrosion inhibitor, after cleaning.
Figure 4C:
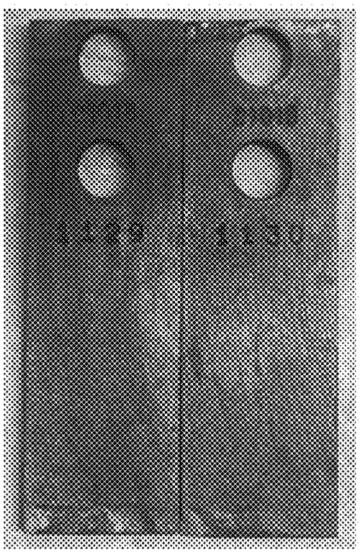
FIG. 4C depicts a photograph of a steel coupon after testing with a corrosion inhibitor, before cleaning.
Figure 4D:
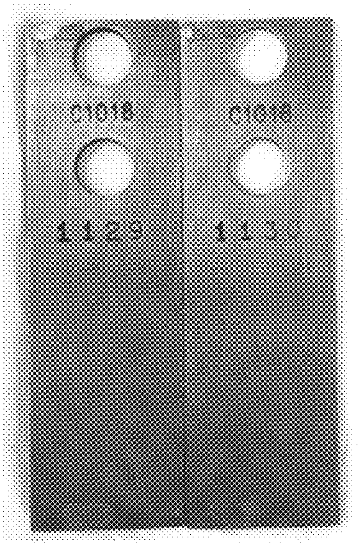
FIG. 4D depicts a photograph of a steel coupon after testing with a corrosion inhibitor, after cleaning.

FIGS. 4A-D show photographs of the coupons after testing with the commercial corrosion inhibitor before cleaning (FIG. 4A), the commercial corrosion inhibitor after cleaning (FIG. 4B), Composition 1 before cleaning (FIG. 4C) and Composition 1 after cleaning (FIG. 4D).

Before cleaning, the coupon tested with commercial corrosion inhibitor (FIG. 4A) contained a greater amount of the FeS scale (black) compared to the coupon tested with Composition 1 (FIG. 4C). This shows that Composition 1 provides high protection of steel surfaces.

Other Embodiments

While certain embodiments have been disclosed above, the disclosure is not limited to such embodiments.

In some embodiments, the compositions can inhibit corrosion in a sweet environment, such as a carbon dioxide containing environment. In some embodiments, the compositions of the disclosure can inhibit corrosion due to the presence of an organic acid and/or a brine. In some embodiments, the brine contains chloride.

In certain embodiments, the 2-substituted benzothiazole includes one or more additional substituents, such as a halogen (e.g., chlorine) group. In certain embodiments, the 2-substituted benzothiazole is 2-(hydroxymethyl)benzothiazole.

What is claimed:

1. A corrosion inhibition composition, comprising:

a 2-substituted benzothiazole of formula:

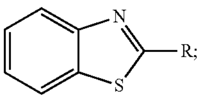

where R is $C_{1-18}$ alkyl, —SH, —$NH_2$, —NH-phenyl, —OH, —C(O)H, —$Si(CH_3)_3$, —$CO_2H$, or —$C_{1-6}$ alkyl-OH;

a cationic surfactant of formula:

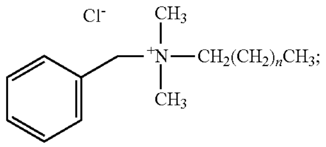

where n=12, 14, 16 or 18;

an ammonium salt selected from the group consisting of ammonium chloride, ammonium bromide, ammonium iodine, ammonium thiocaytanate, ammonium carbonate, and ammonium sulphate;

a glycol; and a solvent that comprises water.

2. The corrosion inhibition composition of claim 1, comprising:

1-15 wt. % of the 2-substituted benzothiazole;

1-10 wt. % of the cationic surfactant;

1-5 wt. % of the ammonium salt;

1-50% of the glycol; and 1-50% of the solvent.

3. The corrosion inhibition composition of claim 1, comprising:

7-9 wt. % of the 2-substituted benzothiazole;

3-5 wt. % of the cationic surfactant;

1-3 wt. % of the ammonium salt;

40-50% of the glycol; and 40-50% of the solvent.

4. The corrosion inhibition composition of claim 1, wherein a ratio of the 2-substituted benzothiazole to cationic surfactant to ammonium salt by weight is 4:2:1.

5. The corrosion inhibition composition of claim 4, wherein:

the 2-substituted benzothiazole comprises 2-mercaptobenzothiazole;

the cationic surfactant comprises benzyl dodecyl dimethylammonium chloride; and the ammonium salt comprises ammonium iodide.

6. A method of using a corrosion inhibition composition, the method comprising:

disposing the corrosion inhibition composition into a first liquid comprising hydrogen sulfide, thereby forming a second liquid; and contacting the second liquid with a member selected from the group consisting of an oil and gas carrying pipeline, a crude producing facility, and a crude processing facility, thereby inhibition corrosion of the member, wherein the corrosion inhibition composition comprises:

a 2-substituted benzothiazole of formula:

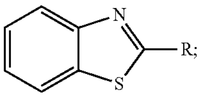

where R is $C_{1-18}$ alkyl, —SH, —$NH_2$, —NH-phenyl, —OH, —C(O)H, —$Si(CH_3)_3$, —$CO_2H$, or —$C_{1-6}$ alkyl-OH;

a cationic surfactant of formula:

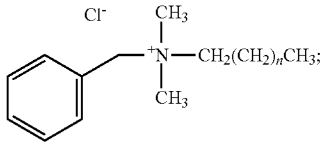

where n=12, 14, 16 or 18;

an ammonium salt;

a glycol; and a solvent that comprises water.

7. The method of claim 6, wherein the first liquid further comprises carbon dioxide.

8. The method of claim 7, wherein a ratio of hydrogen sulfide to carbon dioxide in the first liquid is at least 1:200.

9. The method of claim 6, wherein the member comprises steel.

10. The method of claim 6, wherein the corrosion inhibition composition is present in the second liquid at a concentration of 5 ppm to 100 ppm.

11. The method of claim 6, wherein the corrosion inhibition composition comprises:

1-15 wt. % of the 2-substituted benzothiazole;

1-10 wt. % of the cationic surfactant;

1-5 wt. % of the ammonium salt;

1-50% of the glycol; and 1-50% of the solvent.

12. The method of claim 6, wherein a ratio of the 2-substituted benzothiazole to cationic surfactant to ammonium salt by weight is 4:2:1.

13. The method of claim 12, wherein:

the 2-substituted benzothiazole comprises 2-mercaptobenzothiazole;

the cationic surfactant comprises benzyl dodecyl dimethylammonium chloride; and the ammonium salt comprises ammonium iodide.

14. A corrosion inhibition composition, comprising:

a 2-substituted benzothiazole of formula:

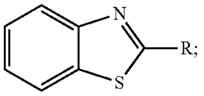

where R is $C_{1-18}$ alkyl, —SH, —$NH_2$, —NH-phenyl, —OH, —C(O)H, —$Si(CH_3)_3$, —$CO_2H$, or —$C_{1-6}$ alkyl-OH;

a cationic surfactant of formula:

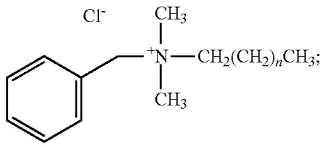

where n=12, 14, 16 or 18;

an ammonium salt;

a glycol; and a solvent that comprises water, wherein the water comprises a member selected from the group consisting of hydrogen sulfide, bisulfide ($HS^-$), and sulfide ($S^{2-}$).

15. The corrosion inhibition composition of claim 14, comprising:

1-15 wt. % of the 2-substituted benzothiazole;

1-10 wt. % of the cationic surfactant;

1-5 wt. % of the ammonium salt;

1-50% of the glycol; and 1-50% of the solvent.

16. The corrosion inhibition composition of claim 14, wherein a ratio of the 2-substituted benzothiazole to cationic surfactant to ammonium salt by weight is 4:2:1.

17. The corrosion inhibition composition of claim 16, wherein:

the 2-substituted benzothiazole comprises 2-mercaptobenzothiazole;

the cationic surfactant comprises benzyl dodecyl dimethylammonium chloride; and the ammonium salt comprises ammonium iodide.

18. The corrosion inhibition composition of claim 14, wherein the water comprises hydrogen sulfide.

19. The corrosion inhibition composition of claim 14, wherein the water comprises bisulfide ($HS^-$).

20. The corrosion inhibition composition of claim 14, wherein the water comprises sulfide ($S^{2-}$).

* * * * *